UNITED STATES PATENT OFFICE.

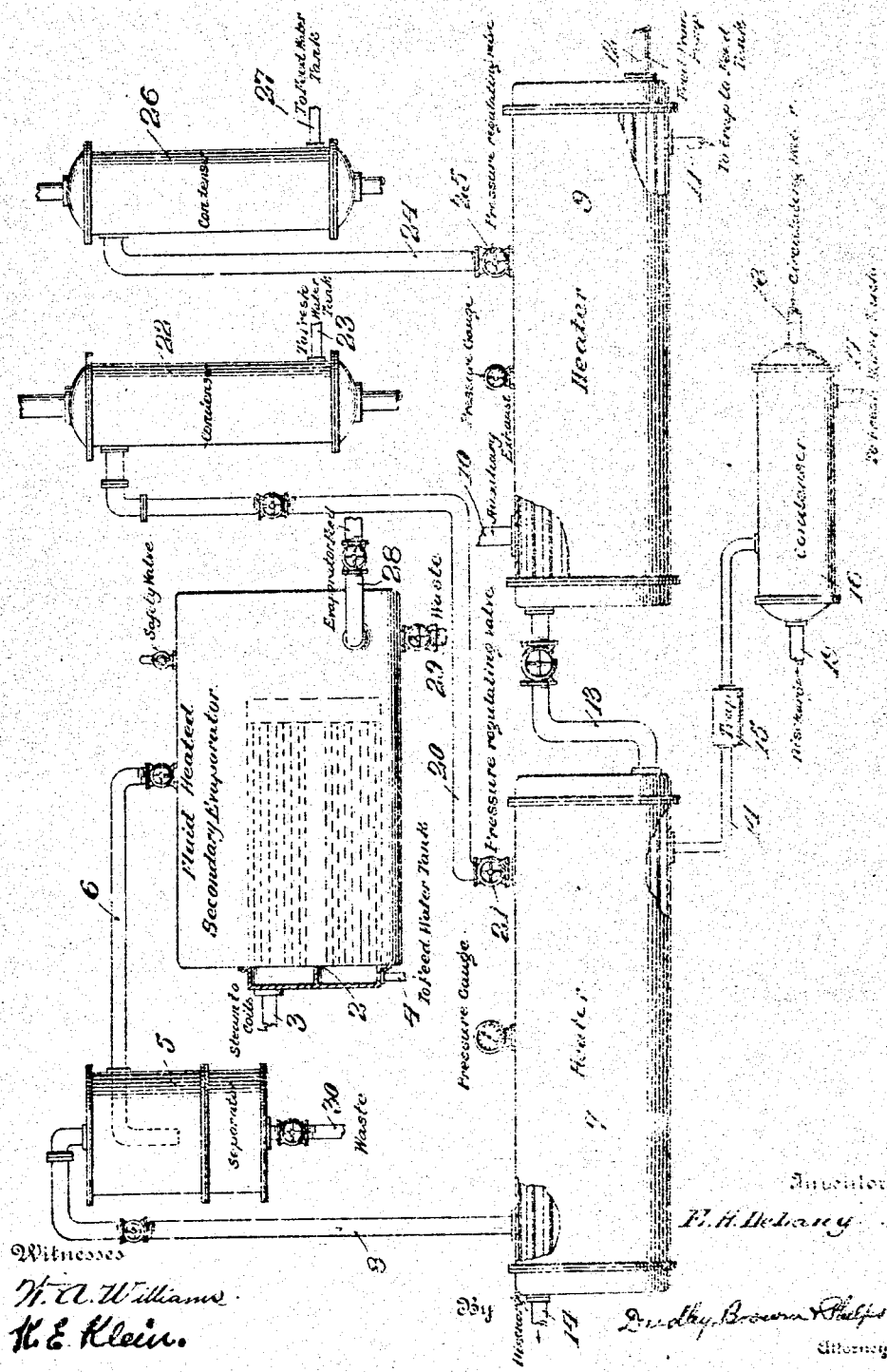

EDWIN H. DE LANY, OF CLEVELAND, TENNESSEE, ASSIGNOR TO DE LANY SEPARATOR COMPANY, OF NEW YORK, N. Y., A CORPORATION OF NEW YORK.

DISTILLING SYSTEM.

971,668.     Specification of Letters Patent.     Patented Oct. 4, 1910.

Application filed January 6, 1910. Serial No. 536,614.

*To all whom it may concern:*

Be it known that I, EDWIN H. DE LANY, a citizen of the United States, residing at Cleveland, in the county of Bradley and State of Tennessee, have invented certain new and useful Improvements in Distilling Systems, of which the following is a specification.

My invention relates to certain new and useful improvements in systems particularly adapted for distilling potable water from sea water, and the object of my invention is to provide a system which is particularly adapted for use on board ship and in which the vapor from the evaporators which supply the fresh water is used solely for the purpose of heating the feed water for the main boilers. As result of this the latent heat contained in the vapor from the evaporators is utilized thus economizing the coal consumption of the vessel. In my system only the vapor from the evaporators alone is used to heat a feed water heater of the surface type, placed preferably on the discharge side of feed pump, and consequently potable water is supplied.

A further object of my invention is to utilize the exhaust from auxiliary engines to preliminarily heat the feed water before it enters the final heater where it is heated to a high temperature by the vapor from the evaporator.

Another advantage of my system is that by using the vapor from the evaporators in the feed water heater a comparatively high pressure may be maintained upon the shell of the heater, so that the feed water delivered to the main boilers is of a very high temperature. For instance if a pressure of thirty pounds above atmosphere is carried in the evaporator a pressure of from six to twenty pounds may be carried on the shell of the feed water heater which will give the feed water a temperature of 200° to 250° Fahrenheit when it passes from the heater.

With these and other objects in view my invention consists in certain combinations and arrangements of parts, one form of which will be first described in connection with the accompanying drawings and then the invention particularly pointed out in the appended claims.

Referring to the drawings wherein the same part is designated by the same reference numeral wherever it occurs the figure illustrates diagrammatically one arrangement of my system.

1 designates an evaporator for water or other liquid to be distilled and is of any ordinary or desired fluid heated type that shown being of the well known Baird type in which a steam coil 2 is employed supplied by steam from any source through the pipe 3.

4 is the outlet from the steam coil and, as indicated, runs to the feed water tank in order not to waste water.

5 designates a separator which preferably is of the form shown and described in my Patent No. 864,158, granted August 27, 1908, which comprises a closed vessel having an inlet pipe 3 which reaches nearly to the bottom thereof, and an outlet pipe 5 from the top thereof; also a screen of fine wire mesh within said vessel as fully shown and described in my said patent, though any other form of separator desired may be substituted therefor. This separator is connected to the evaporator by means of the pipe 6, so that vapor from the evaporator will pass into the separator and have any water or liquid carried by the vapor separated therefrom.

7 designates the final feed water heater for the main boilers, and is of any ordinary or desired construction of the surface type. The shell of the heater is connected to the separator by means of the pipe 8, whereby the vapor after passing through the separator is delivered to the shell of this heater.

9 designates the first or preliminary feed water heater which may be of any ordinary or desired type. The shell of this heater is preferably supplied with exhaust steam from an auxiliary engine through the pipe 10. The water condensed in the heater 9 is discharged through the pipe 11 preferably to the feed water tank as indicated, in order that it may not be wasted.

The feed water to be heated enters the preliminary heater 9 from the feed water tank by the pipe 12, and is discharged from this heater by the pipe 13 into the final heater 7 from which it is delivered by the pipe 14 to the boilers. The water condensed in the shell of the final heater is discharged through a pipe 14, preferably provided with a trap 15 of any ordinary or desired construction, into a cooling condenser 16 of any ordinary or desired construction, from which the water passes, for instance to a storage tank through the pipe 17.

18 and 19 are the pipes for delivering and discharging the water used to cool the condenser 16.

As I prefer to use such a pressure in the final feed water heater 7 as will deliver the feed water at a high temperature it is impossible to always condense all the vapor in this heater. I therefore connect to the wall of this heater a pipe 20 in which I place a pressure regulating valve 21 of any ordinary or desired construction, said pipe leading to a condenser 22 of any ordinary or desired construction where all vapor from the heater 7 is condensed. The water from the condenser 22 is discharged from a suitable pipe 23 to a tank, or disposed of in any other way desired.

As all the steam delivered to the preliminary heater 9 may not be condensed therein, I prefer to connect to the wall of this heater a pipe 24, in which is placed a pressure regulating valve 25 of any ordinary or desired construction, said pipe leading to a condenser 26, of any ordinary or desired construction, whereby all vapor from the heater 9 is condensed. The water from the condenser 26 is discharged from a pipe 27 to the feed water tank or disposed of in any other way desired.

Salt water or other liquid to be evaporated is fed to the evaporator 1 by the feed pipe 28 and the evaporator may be blown out when desired by opening the valve in the waste pipe 29. The separator 5 may also be blown out by opening the valve in the waste pipe 30, or may be discharged through a trap connected to the waste pipe.

It is to be noted that the evaporator, separator, heaters, condensers, etc., may all be of any ordinary or desired construction, as their particular construction forms no part of my invention, which consists in the combination and arrangement of these well known elements to form a new and improved combination which will produce better results more economically than has heretofore been possible.

From the above described construction it will be seen that I have devised a system in which the necessary pressure on the shell of the feed water heater to heat the feed water up to a high temperature may be maintained and which will utilize the heat given the vapor in the evaporators without in any way contaminating the distilled water, and since the water distilled by my system is not contaminated it is of the same quality as would be produced were the vapor condensed by sea water which is passed over-board, as is the ordinary practice on board ship.

While I have described my invention as a system for producing potable water from sea-water, and particularly adapted for use on board ship, I desire to have it understood that my invention is not limited to such use, as the same may be used in the distillation of other raw products, and the system is also applicable to land use as well as on ship board.

I realize that considerable variation is possible in the details of construction and arrangement of parts without departing from the spirit of my invention, and I therefore do not intend to limit myself to the specific form shown and described.

What I claim as new and desire to secure by Letters Patent is:

1. In a combined distilling and feed water heating system for boilers, the combination with a feed water-heater through which the water to be heated is passed to preliminarily heat the feed water, connections for delivering to and discharging a heating medium from the shell of the heater, a second feed water heater, connections between said heaters whereby the water after being heated in the first heater is passed through the second heater, an evaporator, connections between the evaporator and shell and the second feed water heater whereby the feed water is given its final heating by the vapor from said evaporator, and a condenser connected to the shell of the final feed water heater.

2. In a combined distilling and feed water heating system for boilers, the combination with a feed water heater through which water to be heated is passed to preliminarily heat the same, connections for delivering a heating medium to the shell of said heater, a condenser also connected to the shell of said heater to which the heating medium is discharged, a second feed water heater, connections between said heaters whereby the water after being heated in the first heater is passed through the second heater, an evaporator, connections between the evaporator and the second feed water heater whereby the feed water is given its final heating by the vapor from said evaporator, and a second condenser, a discharge pipe for the condensed vapor leading from the heater and a condenser to which said discharge pipe is connected.

3. In a combined distilling and feed water heating system for boilers, the combination with a feed water heater through which water to be heated is passed to preliminarily heat the same, connections for delivering a heating medium to the shell of said heater, a condenser also connected to the shell of said heater to which the heating medium is discharged, a second feed water heater, connections between said heaters whereby the water after being heated in the first heater is passed through the second heater, an evaporator, connection between the evaporator and the second feed water heater whereby the feed water is given its final heating by the vapor from said evaporator, a second discharge pipe connected to the shell of the final heater, said discharge pipe being provided with a pressure regulating valve, and a condenser to which said second mentioned discharge pipe is connected.

In testimony whereof I affix my signature in presence of two witnesses.

EDWIN H. DE LANY.

Witnesses:
H. F. JORJENSEN,
JOHN E. TRUCKSES.